United States Patent [19]

Giammarco, deceased et al.

[11] 4,447,410

[45] May 8, 1984

[54] PROCESS FOR THE CONVERSION OF CARBON MONOXIDE INTO HYDROGEN AND CARBON DIOXIDE

[76] Inventors: Giuseppe Giammarco, deceased, late of Palazzo Morolin, Italy; by Paolo Giammarco, heir, San Marco 3242, Palazzo Morolin, Venezia, Italy

[21] Appl. No.: 490,737

[22] Filed: May 9, 1983

Related U.S. Application Data

[63] Continuation of Ser. No. 195,805, Oct. 10, 1980, abandoned.

[30] Foreign Application Priority Data

Oct. 11, 1979 [IT] Italy .............................. 68990 A/79

[51] Int. Cl.$^3$ .............................................. C01B 1/13
[52] U.S. Cl. .................................... 423/655; 252/373; 423/359; 423/650
[58] Field of Search .................... 423/650, 655, 359; 252/373

[56] References Cited

U.S. PATENT DOCUMENTS

| | | | |
|---|---|---|---|
| 3,441,393 | 4/1969 | Finneran et al. ............. | 423/359 |
| 3,755,556 | 8/1973 | Aldridge ...................... | 423/655 |
| 4,186,181 | 1/1980 | Giammarco et al. .......... | 252/373 |
| 4,254,094 | 3/1981 | Hegarty ....................... | 423/655 |
| 4,264,567 | 4/1981 | Pinto ........................... | 423/650 |

FOREIGN PATENT DOCUMENTS

2828001  2/1979  Fed. Rep. of Germany .

*Primary Examiner*—Gary P. Straub
*Assistant Examiner*—Wayne A. Langel
*Attorney, Agent, or Firm*—Sughrue, Mion, Zinn, Macpeak and Seas

[57] ABSTRACT

Process for the production of hydrogen by reacting combustible substances with steam and converting carbon monoxide present in the resulting gaseous mixture into hydrogen and $CO_2$ by reaction with steam. The amount of steam used in the conversion is increased by contacting said gaseous mixture before the conversion with a stream of water preheated by the gas obtained from the conversion reaction or by other sources of heat at low temperature, to achieve a saturation quench of said gaseous mixture by the conversion of the heated water with sensitive heat of the gaseous mixture into steam, and transfer of the heat from after to before the conversion. The saturated gaseous mixture is then heated to the temperature necessary for the conversion reaction.

5 Claims, 2 Drawing Figures

PROCESS FOR THE CONVERSION OF CARBON MONOXIDE INTO HYDROGEN AND CARBON DIOXIDE

This application is a continuation of application Ser. No. 195,805, filed Oct. 10, 1980, now abandoned.

BACKGROUND OF THE INVENTION

The present invention relates to improvements in the conversion of carbon monoxide into hydrogen and $CO_2$ in the presence of steam and suitable catalysts.

It is known that the conversion yield (in practice the regulation of the content of CO issuing from the conversion apparatus) is greatly influenced, other conditions being left unchanged, by the amount of steam present in the reaction mixture.

To increase the said amount of steam in the gas entering the conversion apparatus, numerous systems and expedients have been proposed and used in the past, in which the excess steam or the heat which is contained in the gas issuing from the conversion apparatus, are recovered and recycled to the conversion to increase its yield.

The most simple of these methods consists in contacting the gas issuing from the conversion and rich in steam with a stream of water, which is thus heated. The stream of water thus heated is circulated and brought into direct contact with the gas to be delivered to the conversion apparatus, which gas is enriched in steam and thus saturated.

However, this method requires, as is known, a noticeable difference in temperature between the gases at the outlet and the inlet of the conversion apparatus, in order to allow transfer of the heat and thus of the steam.

In the present invention, as will be specified in the following, it is, on the contrary, suggested to carry out the said transfer of heat from the outlet to the inlet of the coversion with relatively small differences in temperature, even of the order of 10°-30° C.

It is also known to those skilled in the art that recently two temperature conversion methods have been utilized; the second stage, at low temperatures, which is usually carried out in the presence of a catalyst based on zinc or copper, is characterized in that the temperature of the gas at the inlet of the conversion is 220° C., whereas the temperature of the gas issuing from the conversion is only 230°-240° C.

Under these conditions the transfer of heat and thus of steam from the gas issuing from the conversion apparatus to the gas entering the conversion apparatus can no longer be carried out by means of the aforesaid method.

An object of the present invention is thus to carry out the transfer of heat from the outlet to the inlet of the conversion even in the case of the above conversion method and in other similar cases in which the difference in temperature, as noted in the foregoing, is of the order of 10°-30° C. This will be explained in detail in the following.

Prior to the conversion, the gas is submitted to a special quench, called "saturation quench", different from the quench effected heretofore in the known art.

In the known art, the sensitive heat of the gas, down to 220° C. or similar temperatures, was converted, in the presence of water, into steam which enriched thus the gaseous mixture.

In the present invention, on the contrary, the quench is carried out in a different manner and to a deeper degree, in the sense that the sensitive heat of the gaseous mixture is converted into steam until the said mixture cools down to the saturation temperature (which explains the term "saturation quench"), which in general in the usual installations corresponds to a value of 180°-200° C. As a result, the temperature obtained is sufficiently low to allow the heat present in the gaseous mixture after the conversion to be recovered and delivered to the gas fed to the conversion.

Generally, to this end, the gas issuing from the conversion, (at a temperature of 230°-240° C. or similar) is used to heat a stream of water up to a temperature generally of the order of 190°-215° C. The water thus heated is brought into direct contact with the gas before the conversion in accordance with the saturation quench method indicated above, yielding to the latter its heat with great ease. The water issuing from the saturated quench is then recovered and delivered to an exchanger in which it is heated by means of the heat of the gas issuing from the conversion.

According to the present invention it is also suggested that the gas issuing from the saturation quench be suitably heated up to 220° C. or similar temperatures, in order to be delivered to the conversion apparatus at a temperature sufficiently high to prime the reaction. This heating may be carried out by using a number of embodiments, but in the description of the present invention two embodiments particularly easy and important are stressed, namely:

(1) The gas issuing from the conversion, at a temperature of about 300°-350° C. (i.e. the conversion gas which has previously yeilded heat to a boiler for the production of steam) is divided into two fractions; the first fraction possibly yields part of its heat to the water feeding the boiler and is then submitted to the saturation quench described above down to a temperature of 180°-200° C. At this point, it is mixed with the second fraction of gaseous mixture, the amount of which is suitably regulated to obtain a mixture with a temperature of 220° C.

(2) The gaseous mixture coming from the conversion at high temperature, after its heat has been used for the production of steam and, in suitable conditions, also for heating the boiler feed water, is submitted to the aforesaid saturation quench down to a temperature of 180°-200° C. At this point it is heated up to 220° C. or similar temperatures by means of a heat exchange with the gas at the outlet of the conversion.

SUMMARY OF THE INVENTION

The present invention relates to the series of units for the production of mixture rich in hydrogen, which comprise, as is known:

a first unit in which combustible substances are reacted with steam at high temperatures. These units are those in which gaseous or liquid substances are treated with steam in the presence of catalysts, generally called reforming units. In other units, liquid combustible substances, generally containing sulphur, are treated with oxygen and steam under pressure, and are called partial gasification units; finally, gasification units of solid substances such as carbon, coke, fossil and the like, with steam and oxygen are also within the ambit of the present invention.

A second unit in which the carbon monoxide produced in the first unit is converted into $H_2+CO_2$ according to known methods. The conversion units may be divided into two columns, in the first of which (conversion at high temperature) the gas reacts in the presence of a catalyst based on iron and chromium, whereas in the second the gas reacts at lower temperature and with a catalyst based on zinc oxide and copper and, more recently, also on molybdenum. Units in which the conversion chamber is divided into a plurality of reaction stages are also known.

A third unit in which the gaseous mixture is purified by removal of the $CO_2$ and/or $CO_2+H_2S$ present therein by means of washing with an absorbent solution which, in general, in the most recent methods, consists of potassium carbonate in admixture with activating substances, such as glycine and other aminoacids, diethanolamine and other ethanolamines, arsenious anhydride, selenium and tellurium. Aqueous solutions of ethanolamine, solutions of borate or alkali metal phenates and solutions of salts of aminoacids, may also be used. As in known, these absorbent solutions are regenerated by heating at boiling point by means of the supply of external heat, prevalently the heat present in the gaseous mixture to be purified.

For the production of the steam to be delivered to said units, there is used in the known art a boiler, called process boiler.

Moreover, it is known that in numerous cases the gaseous mixture issuing from the unit for the removal of $CO_2$ is treated in suitable methanation apparatus, in which, as is known, the CO and $CO_2$ present in small traces in the gas are removed on a suitable catalyst and converted into methane. The gas thus purified is used for the synthesis of ammonia, but in other cases the total absence of said compounds of carbon is required.

The functioning of the three units indicated above is known to those skilled in art and is characterized in that the gas is circulated through the three units in series.

At the inlet of the first unit, the gas is admixed with steam coming from the process boiler, only in the amount necessary for the functioning of said unit.

The gas is then passed to the conversion and contains an amount of steam, coming from the first unit, which is regulated such as to be sufficient for the conversion of carbon monoxide; generally, when using conversion units comprising a column at high temperature and a column at low temperature, the content of CO is reduced to values of 0.3–0.4% at the outlet.

The residual heat not consumed in the above units, is used for the functioning of the third unit, i.e. the apparatus for the removal of $CO_2$ and/or $CO_2+H_2S$.

Two different and main aspects are envisaged in the present invention, as will be specified hereunder.

With reference to the first aspect, and in particular in accordance with the teachings of U.S. Pat. Nos. 3,962,404, 4,073,863, 4,146,569 and 4,198,378 and British Patent Application Publication No. 2,019,737 in the name of the Applicants, new regeneration schemes and methods have been used, so that the heat consumption for the apparatus for the removal of $CO_2$ and/or $CO_2+H_2S$, with particular reference to the activated solutions of potassium carbonate, have been reduced by about one third to one half with respect to the conventional techniques. The heat which is made available by means of these known methods, is usually recovered and recylced in the form of a heating of the boiler feed water, which boiler, owing to the recovery of said heat, produces a greater amount of steam or, respectively, requires a lower amount of external heat.

However, it has been noted that the above heat recovery leads to a noticeable apparatus outlay, both for the recovery devices used for the purpose, and owing to the fact that the subsequent heat recovery devices already used in the conventional art, increase the heat exchange surface, since they must heat a water which is already pre-heated.

An object of the present invention is therefore to overcome the above drawback by providing and arranging other systems for recovering and utilizing the heat saved by using the aforesaid new regeneration methods, said systems being different and more efficient than those used heretofore.

Moreover, in the present invention, the above object is achieved not only by means of new and more efficient heat recovery systems, but also, in an easier and more convenient manner, by means of an improved working scheme which permits a lower amount of steam than in the usual art to be delivered from the process boiler to the aforesaid three units.

With reference to the best known and most common case, namely that case well known to those skilled in the art in which the three units consist of a reforming apparatus, a conversion apparatus with a high and a low temperature column, and an apparatus for the removal of $CO_2$ and/or $CO_2+H_2S$ with solutions of activated potassium carbonate, it is suggested and claimed in the present invention to use a new scheme as follows:

The steam produced by the process boiler is delivered only to the reforming unit (that is, to the first unit of the series of the said three units) substantially in the amount required for the functioning of said unit.

It should be noted in this connection that the reforming units of the known art generally operate with a steam/carbon ratio of about 3.8–4.5. This amount of steam is also sufficient for the conversion of CO and to supply about 1000–1200 Kcal/$Nm^3$ of $CO_2$ to the unit for the removal of $CO_2$.

However, it is known that said reforming units may also operate in industrially satisfactory conditions with a reduced amount of steam, i.e. with a steam/carbon ratio of 3.0–3.2. This amount of steam is sufficient for a good chemical functioning of the reforming apparatus and to provide for the consumption in the chemical reactions of the reforming and conversion units. However, owing to the presence of a minor amount of steam, the degree of conversion of carbon monoxide is lesser than in the case of the usual art. Thus, for example, in an installation for the production of 1000 T/day of ammonia, using a steam/carbon ratio of 3.8–4.0, the amount of steam present in the gas issuing from the low temperature conversion is about 65,000 $Nm^3$/hour per 150,000 $Nm^3$/hour of converted gas. This corresponds to a cnversion value of about 0.3% of CO at the outlet. When on the contrary the steam/methane ratio at the inlet of the reforming is reduced to 3–3.2, as indicated above, the amount of the steam present in the gas, at the end of the conversion reaction, is reduced respectively to 42–48,000 N $m^3$/hour per 150,000 N $m^3$/hour of dry gas. This corresponds, other conditions being left unchanged (i.e. volume, efficiency and age of the catalyst), to a conversion value of about 0.4–0.46% of CO at the outlet.

As is known in the art, with specific reference to the case of the production of ammonia, the said decrease in conversion value brings about a noticeable decrease in production of ammonia, of the order of 1.8–2.35%.

An object of the present process is to overcome the said drawback or, with reference to the second aspect mentioned hereinbefore, to obtain on the contrary a noticeable improvement in conversion value, insofar as the supply of heat of the process boiler is maintained at the usual values currently used, but the steam present during the reaction is increased by means of the transfer, as already defined, of the heat and thus of the steam from the gas at the outlet of the conversion to the gas at the inlet of the conversion.

In both cases, the recycle of heat from the outlet to the inlet of the conversion yields additional amounts of steam which are not supplied by the process boiler, but, substantially, by heats at low temperature available in the aforesaid three units, and no longer utilizable for supplying heat to the boiler for the water vaporization, and also by heats which are used twice, a first time in the form of steam in the conversion apparatus and a second time for other services at low temperature.

This is one of the most important features of the present process. It should in fact be noted that in the process boiler the vaporization heat of water depends on the boiling temperature, which in the conditions of the current art is about 240° C. In the present invention, on the contrary, as will be specified in the following, the steam is produced in the presence of the gases delivered to the conversion, i.e. at a lower partial pressure, so that the vaporization heat of water is supplied at a temperature which is noticeably lower and more convenient.

Moreover, with respect to the double use of the heats and steams specified hereinbefore, the advantage lies in the fact that the Applicants have found—as described and claimed in the present invention—that contrary to the common opinion, the passage of the steam in the conversion apparatus is noticeably more convenient than the passage of said steam in the turbine for the supply of mechanical energy, used in the current art.

These heats, claimed in the present invention, are the following:

(a) Sensitive heat at low temperature (and no longer utilizable in a boiler as noted in the foregoing) present in the gas before the conversion, and anyway before the last conversion stage, or else before the low temperature conversion column. This heat is converted into steam by means of treatment of the gas in direct contact with hot water, according to the aforesaid method (saturation quench) which aims at cooling the gas down to the temperature required for the feeding to the last conversion stage, thus converting the sensitive heat of the gas into steam.

Another feature of the present invention consists in the fact that the said sensitive heat of the gas at low temperature, before the conversion, instead of being recovered and used for heating boiler water as in the hitherto known art, is used for producing steam by means of the so-called saturation quench; the steam is then passed through the conversion unit, with consequent improvement in the conversion value of CO; it is then recovered, after the conversion and its utilization in said conversion, by using various methods, including also that which consists in heating the boiler feed water. This method presents therefore, with respect to the current art, the advantage that said sensitive heat is used twice, a first time in the form of a transfer of heat in the conversion, and a second time in the form of a recovery and heating of the boiler water.

(b) Heat of the gas after the conversion. In the present invention, this heat is used for producing hot water by means of a heat exchange. This hot water is then used in the saturation quench, so that the steam is produced therein, in addition to the sensitive heat of the gas, also by said hot water, in accordance with the embodiments shown in the following in paragraphs A and B. The steam thus produced is passed to the conversion, and thereafter is recovered and recycled as indicated above to the said gas before the conversion by using the methods shown in the following.

(c) Heats for services at low temperature, i.e. for the degassing and purification of the boiler feed water, the production of steam for injectors, pumps, turbines, and the production of steam used in the regeneration column, both by means of reboilers and by means of a direct delivery into said column.

In the hitherto known art, said services at low temperature are operated by using steam at medium pressure (i.e. steam at the pressure of the reforming apparatus, at about 35–50 Atm) which is previously circulated in a counterpressure turbine to produce mechanical energy.

The counterpressure steam, in general at 5 Atm is then used for the said services at low temperature.

It is suitable to note in this connection, especially with reference to the above considerations, another prerogative, and perhaps the most important one, of the present invention.

The Applicants have ascertained that, contrary to the common opinion, the embodiment shown above sub (c), generally used in the current art, is less convenient than that claimed and suggested in the present invention, in which the steam—instead of being passed through the turbine—is previously passed through the conversion (where it yields, with greater benefit, an improvement in the conversion value and, in the case of a plant for the production of ammonia, a consequent increase in production of said ammonia), and then the heat corresponding to said steam is taken again after the conversion and used, directly or indirectly, for said services at low temperature.

The above statement may be extrapolated also to those cases in which the steam at medium pressure (35–40 Atm) is used in condensation turbines, as is usual in the current art. On the contrary, the fact that the passage of the steam in the reforming units and subsequently in the conversion units, and the economical advantage which results from the higher purification of the gas and, in the case of a plant for the production of ammonia, the consequent increase in production of ammonia, is more advantageous than the passage of said steam through the condensation turbines, is clearly in contradistinction with what was used until now in the current art. This advantage is still more obvious when one considers that the condensation heat of the steam in the turbines is lost, whereas the heat of the steam, after the passage in the conversion, still offers the possibility of being used for other purposes.

This can easily be shown by considering that the residual CO after the conversion apparatus, as well as the residual $CO_2$ after the apparatus for the removal of $CO_2$, are converted into methane in the methanation apparatus to which reference was made in the foregoing. It is known that one volume of CO requires for said conversion a further 3 volumes of hydrogen, and that one volume of $CO_2$ requires on the contrary four volumes of hydrogen. Moreover, the methane obtained by methanation of CO and $CO_2$ is delivered to the synthesis apparatus, which brings about an important drawback, owing to the fact that said methane must be removed to maintain its concentration in the vicinity of a pre-determined value (about 10–15%). This means that for each volume of $CO_2$ or CO, there is an overall loss of about 10 volumes of hydrogen, and thus, in the case of an apparatus for the production of ammonia, a loss of production of said ammonia equal to about 1.5% of $NH_3$ for about 0.1% of $(CO+CO_2)$.

It can be seen from the above that another object of the present process is that of increasing the production of ammonia as specified above by reducing the amount of CO and $CO_2$ by means of the methods indicated above.

Once the steam, according to the teaching of the present invention, has been delivered from the process boiler only to the reforming and to a lesser extent than in the known art, and once that, according to the other prescription of the present process, the steam present in the conversion has been increased by means of the addition of further amounts of steam obtained from low temperature heats—and thus no longer from the process boiler—or else from heats or steams which are used twice, as sepcified above, it results that after the conversion the quantity of heat present, which often in the industrial practice is higher than that required for the functioning of the apparatus for removing CO and/or $CO_2+H_2S$, especially when said apparatus is operated by using regeneration methods at low heat consumption, in which case, as is known, the regeneration heat is reduced for the present by 30–50% with respect to the current consumptions.

It is therefore necessary that the amount of heat in excess with respect to the quantity required for the functioning of said apparatus for removing $CO_2$ and $CO_2+H_2S$ (independently of the fact that said apparatus is of the type used in the hitherto known art, or of the type of low heat consumption), be taken again by means of suitable recovery methods, and recycled. On the basis of what has been specified above, in the present invention the quantity of heat to be recovered and recycled may also be very important, and therefore an important feature of the invention is that of affording a great number of recovery methods, especially convenient, in a manner adapted to said object, which is one of the most important of the invention. Said methods are chosen among the following:

heating of water by means of heat exchange with the gases after the conversion, and use of said water with the heat present therein for saturating the process gases, such as natural gas, air, $CO_2$ or the like, before delivering the latter to the reforming and conversion apparatus. This method is described in U.S. Pat. No. 4,186,181 in the name of the Applicants;

heating of water by means of heat exchange with the gases after the conversion, and use of said water with the heat present therein for the treatment in direct contact (saturation quench) of the gas, before the final conversion step, according to the embodiments shown in the foregoing sub points A and B;

production of steam at low pressure, and use of said steam for the services at low temperature, or else utilization in turbines or re-entry in turbine;

heating of boiler feed water by means of heat exchange with the gases after the conversion, and recycle of the heat to the process boiler.

The saturation quench of the type used in the present invention, to which reference was made in the preceding, will now be documented and described.

As is known, in the usual quench used in some cases in the known art, the gas issuing from the conversion at high temperature, is cooled down to the temperature required for the delivery to the conversion at low temperatures—i.e. down to about 220° C.—by means of direct contact with water, suitably sprayed into the gas, which vaporizes while the temperature decreases as stated above, with consequent conversion of the sensitive heat of the gas into steam down to the said temperature. In this manner, as is known, the gas delivered to the conversion has still a content of steam which is remote from the quantity required for the saturation.

In the present invention the so-called "saturation quench" makes use for the treatment in direct contact with the gas, of water which, as specified above, has been heated fundamentally by the heat contained in the gas after the conversion and, possibly, by the heat contained in the fumes of the reforming apparatus, so that the steam produced in the quench comes also from the heat contained in said hot water. The saturation quench is carried out by means of one of the two systems shown in the preceding and described in greater detail hereunder, or by means of similar systems.

Figure 1:
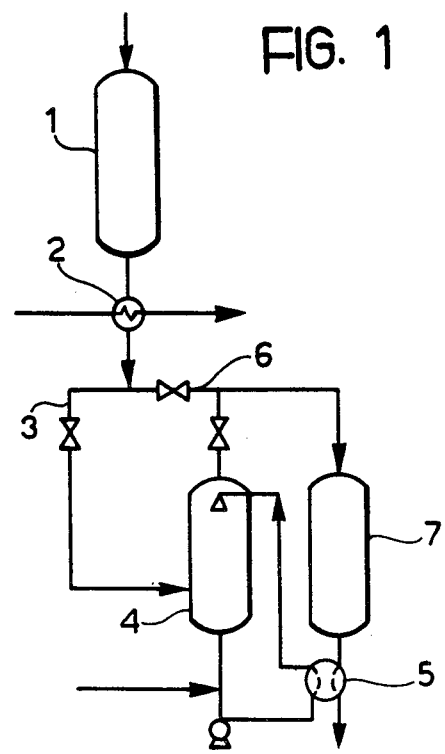
FIG. 1 is a schematic view of a first embodiment of the invention.

DETAILED DESCRIPTION OF THE INVENTION (A) In the first embodiment shown in FIG. 1, the gas issuing from the conversion column (1) at high temperature, after passage through the boiler for the production of steam (2), is divided into two fractions (3) and (6): the first fraction (3) is delivered to the quench chamber (4), in which it is put into direct contact with hot water. This hot water is circulated by means of a suitable pump between the heat recovery device (5) arranged at the outlet of the conversion, and the said quench chamber. The production of steam in said quench chamber is therefore that coming from the sensitive heat contained in the gas, and also that coming from the recovery device (5) which heats said hot water by means of the heat contained in the gas after the conversion.

As a result, the gas issuing from the top of the quench chamber is completely saturated with water and its temperature is the saturation temperature, in correspondence with the steam it contains and has stored in the quench chamber. This gas has a temperature (about 180°–200° C.—or else a temperature within a broader range) lower than that required (about 220° C.) for being delivered to the conversion column at low temperature. Therefore, the gas is mixed with the second fraction (6) of gas described above, the amount of which is regulated by means of an automatic system in order to obtain the said temperature, and is then delivered to the conversion chamber (7) at low temperature; at the outlet of the latter it is passed through the heat recovery device (5), yielding heat to the hot water which is circulated in the quench chamber as stated above.

As is clear for the preceding description, the system permits a heat recycle between the gas after the conversion and that before said conversion, thus increasing in the latter the content of steam and thus improving the degree of conversion.

The said system, instead of heating the water by means of the heat of the gas after the conversion, i.e. by means of the heat recovery device (5), may be used by heating the water by means of another heat available and recovered in the unit used in the present invention, and in particular by using the heats of the combustion fumes of the reforming apparatus. It is sufficient to this end to replace the exchanger (5) by another exchanger using said other sources of heat.

Figure 2:
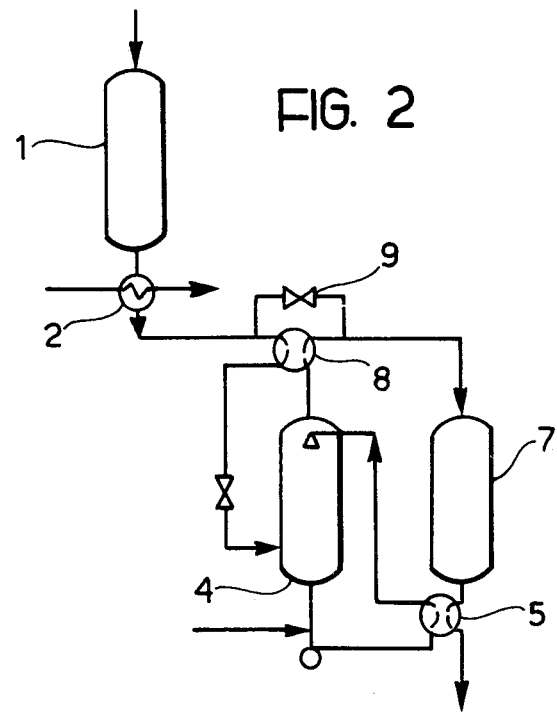
FIG. 2 is a schematic view of a second embodiment of the invention.

The second embodiment of FIG. 2 is similar to the preceding one, but differs therefrom in that the gas issuing from the conversion chamber (1) at high temperature, after the recovery boiler (2), is not divided into two fractions, but is passed through a heat exchanger (8) and then enters the quench chamber (4), in which it is contacted with hot water circulated by means of a pump through the heat recovery device (5), as in the preceding case.

The gas issuing from the top of the quench chamber (4) is saturated with water, corresponding to the steam evolved both by means of the sensitive heat of the gas, and by means of the heat coming from the exchanger (5), and is heated up to the temperature (about 220° C.) required for the conversion chamber (7) at low temperature by means of the said exchanger (8). Therefore, the same aim as in the preceding embodiment is achieved. Suitable control of the temperatures may be achieved by means of a by-pass (9).

The embodiment is obviously suitable also in the case of the use of other available heats, different from those contained in the gas at the outlet of the conversion.

It may be said in short that in the present invention the steam produced in the boiler is delivered only to the inlet of the reforming unit or similar apparatus, and only in the amount necessary for the functioning of said unit. This permits the achievement of the first object, which consists in reducing the consumption of heat supplied from the outside to the three units referred to in the present invention. This permits also the achievement of the object resulting from the use of a minor amount of heat supplied from the outside, namely that the thermal connection with the unit for the removal of $CO_2$ and/or $CO_2+H_2S$, operated by using regeneration methods at low heat consumption, is noticeably simplified and improved, because the necessity of recovering and recycling the heat in excess with respect to the requirements of the unit for removing $CO_2$ is lesser.

However, owing to the reduction of the supply of external heat, the amount of steam present in the conversion unit may be lower than that usually required in the modern technique, and may therefore bring about a worsening in the degree of conversion; this drawback is overcome in the present invention, as results from the preceding description.

It should also be noted that the process of the present invention, owing to the quantity of additional steams, may be used also under the conditions of the usual technique, improving, however, the degree of conversion since the recycle of heat causes an increase in the quantity of steam used in the reaction.

The above considerations may be better explained as follows:

With reference to the units used in the reforming the steam is delivered from the boiler to the first unit of the series (i.e. to the reforming), as stated hereinbefore, in a steam/carbon ratio of 3.2. Since the consumption of steam in the chemical reactions of reforming of methane and of conversion corresponds to a steam/carbon ratio on 1.43, it results that at the end of the conversion the residual ratio is $3.2-1.43=1.77$. As a result, in a plant for the production of 1000 T/day of $NH_3$ from methans, in which the quantity of $CO_2$ at the outlet of the conversion is about 27,000 N m$^3$/hour, the steam is present in an amount of $1.77 \times 27,000 = 48,000$ N m$^3$/hour. This corresponds to the fact that the heat of the gas after the conversion is sufficient to yield to the unit for the removal of $CO_2$ about 750 Kcal/N m$^3$ of $CO_2$, as is required in the cases in which the regeneration of the solution in said unit for the removal of $CO_2$ is carried out by means of the aforesaid methods at low heat consumption.

When, on the contrary, by using the methods of the present invention, further additional amounts of steam are delivered to the conversion, for example the steam coming from the quench of the gas before the conversion (this quench, in a plant for the production of 1000 T/day of $NH_3$, generally affords the production of a further 20–21,000 N m$^3$/hour of steam), the amount of steam at the outlet of said conversion is $48,000+20,000=68,000$ Nm$^3$/hour. The said quantity of steam corresponds to a quantity of heat of about 1000–1200 Kcal/N m$^3$ of $CO_2$ present in the gas, so that 700–750 of said calories are used in the unit for the removal of $CO_2$ of the type at low heat consumption, whilst the remaining 300–400 calories are recovered and recycled, for example by means of a heating of the boiler feed water or, preferably, by means of the other methods suggested in the present invention.

Obviously, when further amounts of steam are added in the conversion, besides that coming from the quench of the gas before the conversion, the quantity of heat which must be recovered and recycled is correspondingly increased.

It should be noted that, on the basis of the foregoing considerations, instead of reducing the consumption of heat by delivering to the reforming a minor amount of steam, it is also possible to achieve an improvement in the degree of conversion of carbon monoxide, and also in the removal of $CO_2$ in the apparatus for removing said $CO_2$, in order to obtain eventually a gas of higher purity, i.e. with a content in $CO + CO_2$ lower than usual. This affords an economical benefit which sometimes may be more interesting and of higher extent than than deriving on the contrary from the reduction of the heat consumption. This higher benefit is clearly achievable in the installations for the production of $NH_3$, in which there is obtained a noticeable increase in production.

Thus, for example, the steam may be delivered to the first unit of the series, i.e. the reforming unit, in the usual quantity (i.e. with a steam/carbon ratio of 3.8–4.0). However, the gas, in the following conversion unit, receives further additional amounts of steam, so that the degree of conversion is substantially improved, thus obtaining at the outlet a CO content which in some cases may be reduced down to 0.1%. In the following the working scheme is that previously described, excepting the fact that the heat delivered to the unit for the removal of $CO_2$ may possibly be increased to improve the purification with consequent reduction of the content of $CO_2$ in the purified gas. This means an increase in production which may reach about 4–5% of the $NH_3$, with consequent benefit both with respect to the outlay for said apparatus, and the economical yield of the apparatus. Even in the synthesis of $NH_3$ the use of a gas purified a specified above, is particularly appreciable.

Some embodiments already shown in the preceding description will be illustrated in the following Examples.

EXAMPLE 1

In a plant for the production of 1000 T/day of $NH_3$ by means of a treatment of methane with steam corresponding to a production of 92,000 N $m^3$/hour of hydrogen and 27,000 N $m^3$/hour of final $CO_2$, a quantity of steam corresponding to a steam/carbon ratio of 3.2 is delivered from the process boiler to the reforming unit.

As is known, the consumption of heat in the reforming unit and in the subsequent conversion units, corresponds to a steam/carbon ratio of 1.43.

Therefore, at the final outlet of the conversion apparatus, the steam/carbon ratio is $3.2 - 1.43 = 1.77$. This corresponds to a quantity of steam of $1.77 \times 27,000 = 48,000$ N $m^3$/hour of $H_2O$.

Under these conditions, with the volume of catalyst and the temperature used in the known art, the content of CO at the outlet of the conversion is about 0.4%.

In the present invention, the said degree of conversion is improved by means of the addition of further steam in the said conversion apparatus, without increasing the supply of external heat.

It should now be noted that, in the known art, the heat of the gas at the outlet of the conversion at high temperature is, in the initial part, used for the production of process steam in a suitable boiler, and the remaining part is instead used for heating the boiler feed water in a suitable saver. This saver, in general, with reference to that plant for the production of 1000 T/day of $NH_3$, has a thermal service equal to about 9,000 Kcal/hour.

In the present invention, the above heat, i.e. the heat that the saver recovers in the form of heating of boiler water, is instead eliminated and used for producing steam by means of the "quench", i.e. by treatment of said gas in direct contact with water, so that the said 9,000 Kcal are used to produce 21,900 N $m^3$/hour of $H_2O$ within said gas. As a result, in the column at low temperature of the conversion apparatus, there are used $48,000 + 21,900 = 69,000$ N $m^3$/hour of $H_2O$.

The degree of conversion is therefore improved from an initial value of 0.4 down to 0.275% of CO, other conditions such as volume, efficiency and temperature of the catalyst, being left unchanged. There is thus a reduction of the content of CO at the outlet by 0.125%, to which corresponds an increase in production of ammonia of about 1.9%, corresponding to an additional production of 19 T/day of $NH_3$.

The present invention affords moreover, a further increase in the amount of steam present in the conversion, owing to the fact that the heat contained in the gas issuing from the conversion at about 235°-240° C. according to the known art, is used to heat water up to about 200° C. This water is used in the saturation quench before the conversion, according to what is specified sub (A) and (B), yielding to said gas before the conversion a further amount of 10,000 N $m^3$/hour of steam.

It results that the steam circulating in the conversion column at low temperature is increased up to 80,000 N $m^3$/hour.

Therefore, the degree of conversion is improved from 0.4 down to 0.24%. There is thus a reduction in CO content at the outlet equal to 0.16%, which corresponds to an increase in production of about 2.4%, corresponding to a further production of 24 T/day of $NH_3$.

Further improvements may be achieved by means of the transfer of further amounts of steam to the conversion, as specified in the preceding description of the invention.

The gas, after issuing from the conversion under the conditions specified above, contains a quantity of heat, either in the form of steam or in the form of sensitive heat of the gas, which is used either for the functioning of the unit for removing $CO_2$ and/or $CO_2 + H_2S$, or the recovery and recycle by means of the methods shown in the preceding description. These are proportionated in equal quantities and efficiencies, so that the residual heat be about 1000 Kcal/N $m^3$ of $CO_2$ when the apparatus for removing $CO_2$ and/or $CO_2 + H_2S$ is of the conventional type of the hitherto known art, these values being instead reduced to 750 or even 500 Kcal/N $m^3$ of $CO_2$ when the new regeneration methods at low heat consumption, referred to in the description, are used.

EXAMPLE 2

In a plant for the production of 1000 T/day of $NH_3$ having the same characteristics as in Example 1, the steam delivered from the process boiler to the inlet of the reforming is used in a steam/carbon ratio of 4. As a result, after deduction of the steam consumed in the reforming and conversion reactions, the steam at the final conversion outlet is present in a quantity corresponding to a ratio of $4.0 - 1.43 = 2.57$, which corresponds to a quantity of steam of $2.57 \times 27,000$ N $m^3$/hour of $CO_2$, corresponding to 69,000 N $m^3$/hour of $H_2O$.

In a manner similar to that described in Example 1, there are used by means of the quench the 9,000 Kcal present in the gas in the form of sensitive heat before the conversion, thus obtaining a further presence of 21,900 N $m^3$/hour of steam, and use is also made of the recovery of the heat possessed by the gas after the conversion, with consequent supply of a further 10,000 N $m^3$/hour of steam, the total presence of steam being equal to $69,000 + 21,900 + 10,000 = 100,900$ N $m^3$/hour of $H_2O$.

This corresponds to an improvement in degree of conversion down to 0.19% of CO at the outlet, with the consequent benefits in respect to the increase in production of ammonia.

We claim:

1. In a process for the production of hydrogen in a plant comprising a first unit defining a high temperature reaction stage in which combustible substances are reacted with steam at high temperature to provide a high temperature gas, a second unit including a low temperature conversion stage for the conversion of carbon monoxide present in the gas thus obtained in said first unit by means of reaction with steam and a unit for the removal of $CO_2$ and/or $CO_2 + H_2S$ from the gaseous reaction mixture thus obtained in which the steam necessary for the functioning of said units is supplied by a process boiler, the improvement comprising increasing the amount of steam present in the high temperature gas during the conversion reaction by heating a stream of water by means of the heat contained in the gaseous mixture at the outlet of said low temperature conversion stage, bringing the high temperature gas from the high temperature conversion stage into direct contact with said heated stream of water to convert the heat of said water thus heated and the sensitive heat contained in the gas contacted with said water to produce steam until the gas from the high temperature conversion stage cools down to the saturation temperature to provide a saturated gas, utilizing the heat of the high temperature gas prior to bringing the high temperature gas into contact with said heat stream of water to heat said saturated gas up to the temperature required for the functioning of the low temperature conversion stage and delivering said overheated gas to said low temperature conversion stage.

2. The process of claim 1, wherein the steam delivered from the outside to the inlet of the unit for the treatment of combustible substances with steam, is used in a quantity corresponding to a steam/carbon ratio of from 3.0 to 3.2.

3. The process of claim 1, wherein the steam delivered from the outside to the inlet of the unit for the treatment of combustible substances with steam is used in a quantity corresponding to a steam/carbon ratio of from 3.8 to 4.0.

4. The process of claim 1, wherein the treatment of the gas at the inlet of the low temperature conversion stage by means of hot water is carried out by dividing the gas from the high temperature conversion stage into two fractions, bringing the first fraction in direct contact with said hot water and cooling said first fraction down to complete saturation at the expense of the heat contained both in the gas and in the hot water and adding the second fraction to the first fraction in such proportions as to obtain a gaseous mixture having the temperature required for the delivery to the low temperature stage.

5. The process of claim 1, wherein the treatment of the gas at the inlet of the low temperature conversion stage by means of hot water is carried out by circulating the gas from the high temperature conversion stage through a heat exchanger, bringing said gas into direct contact with said hot water until complete saturation, at the expense of the heat contained both in the gas and in the hot water, circulating said saturated gas through the said exchanger in which it is heated up to the temperature required for the delivery to the low temperature conversion stage.

* * * * *